United States Patent [19]

Birkestrand

[11] Patent Number: 4,776,248
[45] Date of Patent: Oct. 11, 1988

[54] MACHINE FOR CUTTING PIPE, TUBING OR THE LIKE WITH CUTTER PLANE ADJUSTMENT

[76] Inventor: Orville J. Birkestrand, 1854 Linda Vista Ave., Pasadena, Calif. 91103

[21] Appl. No.: 906,881

[22] Filed: Sep. 15, 1986

[51] Int. Cl.$^4$ .............................................. B23B 5/14
[52] U.S. Cl. ...................................... 82/4 C; 82/92; 82/100; 30/94; 30/102
[58] Field of Search ..................... 82/4 C, 36 R, 70.1, 82/79, 92, 93, 100, 101; 30/92, 93, 94, 95, 102; 407/7, 88; 493/290, 475

[56] References Cited

U.S. PATENT DOCUMENTS

| | | | |
|---|---|---|---|
| 963,559 | 7/1910 | Hines | 82/36 R |
| 2,350,535 | 6/1944 | Sarulla | 82/92 |
| 3,817,649 | 6/1974 | Medney | 82/4 C |
| 4,072,073 | 2/1978 | Birkestrand | 82/92 |
| 4,412,401 | 11/1983 | Fundell | 82/4 C |
| 4,467,679 | 8/1984 | Johne et al. | 82/36 R |
| 4,477,211 | 10/1984 | Briese | 407/7 |

Primary Examiner—Frederick R. Schmidt
Assistant Examiner—William E. Terrell
Attorney, Agent, or Firm—William T. O'Neil

[57] ABSTRACT

A pipe cutting machine having a pair of parallel, horizontal driven rollers for supporting and rotating the work to be circumferentially cut. A cutter head assembly includes a free rotating cutter wheel on a shaft generally parallel to the driven rollers. Coarse vertical positioning of the cutter head is effected by sliding it up or down over a generally vertical support column. Detenting of this vertical positioning is effected by a spring-loaded pin engaging a selected groove among a plurality of vertically spaced, horizontally extending grooves associated with the vertical column. Vernier advancement of the cutter into the work is accomplished by an eccentric and lever arrangement associated with the cutter head assembly.

A gear box arrangement couples the torque of a driving motor, which may be permanently or removably attached, providing drive to the rollers and to a reamer. A hand drill is shown positioned to provide motive power.

A skewed-bore bushing supports a shaft connected to an operating lever for orienting the plane of the cutter wheel to provide adjustment compensating for manufacturing tolerances.

4 Claims, 3 Drawing Sheets

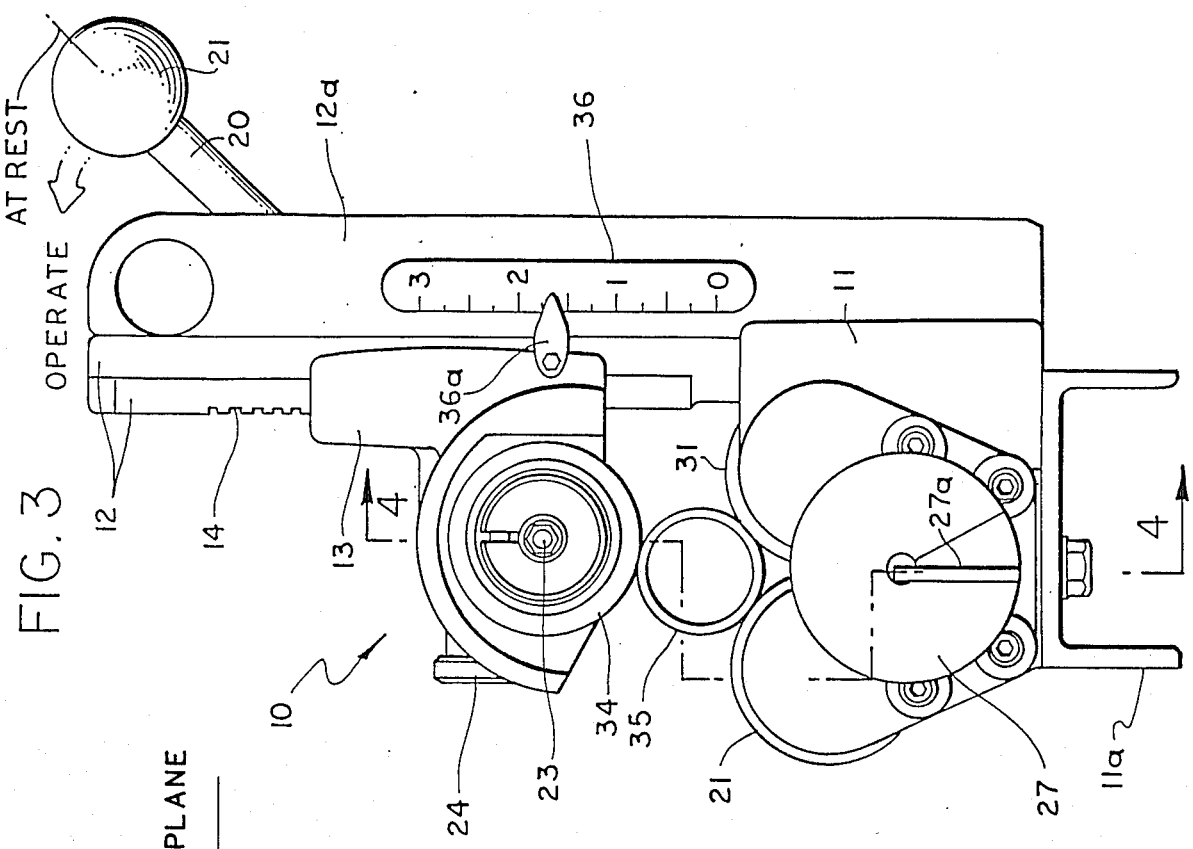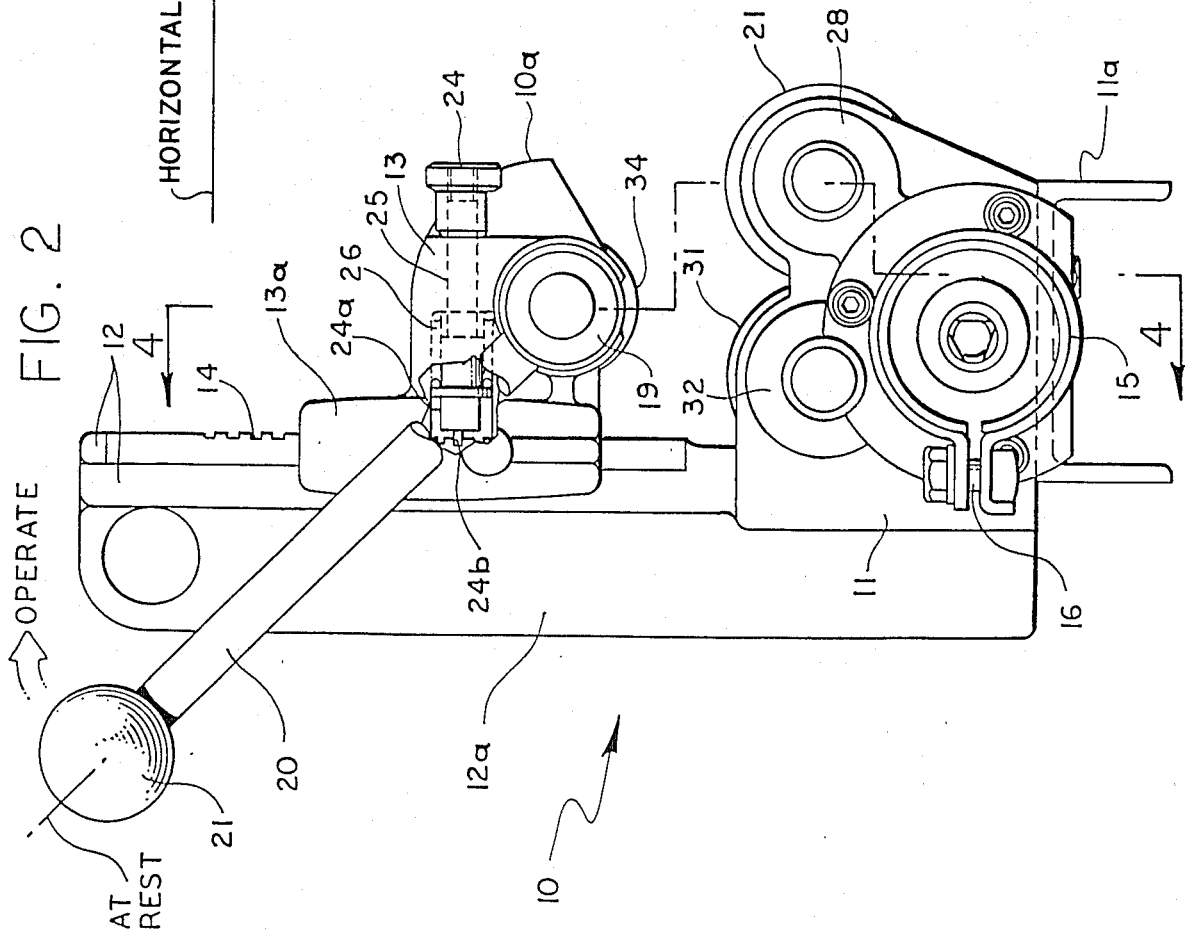

MACHINE FOR CUTTING PIPE, TUBING OR THE LIKE WITH CUTTER PLANE ADJUSTMENT

BACKGROUND OF THE INVENTION

1. Field of the Invention

The invention relates to machinery for cutting pipe, tubing or the like, particularly pipe or tubing of relatively small diameter.

2. Description of the Prior Art

In the prior art, machinery for cutting pipe and tubing in extant in a variety of forms. The prior art structures exist in forms accommodating a variety of pipe diameters ranging from a small fraction of an inch to sizes found in water mains and drainage conduits.

The invention herein to be described is most relevant to machinery for cutting pipe most often encountered in small building construction and plumbing repair or in small manufacturing operations where only minimal machinery investment is justified.

The prior art includes powered metal saws of the reciprocating or circular blade types and machines using rotating abrasive cutter wheels. The prior art devices most relevant to the machine of the invention are those employing parallel driven rollers forming a cradle for the work and a free-wheeling cutter wheel advanced against the work from above. Such a prior art device is disclosed in U.S. Pat. No. 4,072,073. That invention and the present invention have the same inventorship. Other machinery of general background interest is disclosed in the list of cited references printed in U.S. Pat. No. 4,072,073, although those citations are much less relevant to the present invention than U.S. Pat. No. 4,072,073 itself.

There exists a need in the art for a pipe cutting machine which is relatively inexpensive to manufacture, convenient to use and capable of quick readjustment for pipe size. The manner in which the invention advances the state of this art will be apparent as this specification proceeds.

SUMMARY OF THE INVENTION

The pipe cutting machine according to the invention incorporates certain general features from the disclosure of the aforementioned U.S. Pat. No. 4,072,073 including the driven, work-supporting rollers and the eccentric arrangement whereby a substantial mechanical advantage is achieved as the operating hand lever is activated under operator control to advance the free-wheeling (not rotationally driven) cutter wheel against the work.

Coarse vertical positioning of the cutter head assembly to accommodate pipe size is accomplished by a rack and spring-loaded pin arrangement. The pin is associated with the vertically positionable cutter head assembly and the rack, which is essentially a plurality of horizontally extending, vertically spaced grooves is associated with the cutter head support column. Engagement of the aforementioned pin into a selected one of the grooves locks the cutter head into an operator selected vertical position. The aforementioned eccentric arrangement may be considered to be the fine cutter head positioning in that it provides for the small travel effecting advancement of the cutter wheel against the work.

A bushing through which the shaft turned by the operating hand lever passes has a skewed bore such that this shaft can be caused to assume slightly different angles with respect to the horizontal and vertical planes as the bushing is rotated as an initial adjustment having the effect of bringing the line of intersection of the plane of the cutter wheel normal to the longitudinal axis of the work. This adjustment capability reduces the need for manufacturing precision in fabricating the machine according to the invention.

It may be said to have been the general objective of the invention to provide a pipe and tubing cutter which is easily used and is so relatively inexpensive as to be economically feasible for small shops, is capable of rapid pipe size adjustment, and is capable of employing a conventional hand drill as its motive power.

The term pipe as used hereinafter means an elongated work member of circular, annular cross-section, sometimes called tubing or the like.

The manner in which the objective is achieved will be understood as this specification continues hereinafter.

BRIEF DESCRIPTION OF THE DRAWINGS

FIG. 2 is a side view (from the operator's left) of the machine of FIG. 1.

FIG. 3 is a side view (from the operator's right) of the machine of FIG. 1.

DETAILED DESCRIPTION OF THE PREFERRED EMBODIMENTS

In the description following, the figures may be referred to in non-sequential order, when appropriate for clarity of description. The same element depicted in more than one figure is always consistently numbered.

The machine is depicted by the overall designation 10 in the figures.

Figure 1:
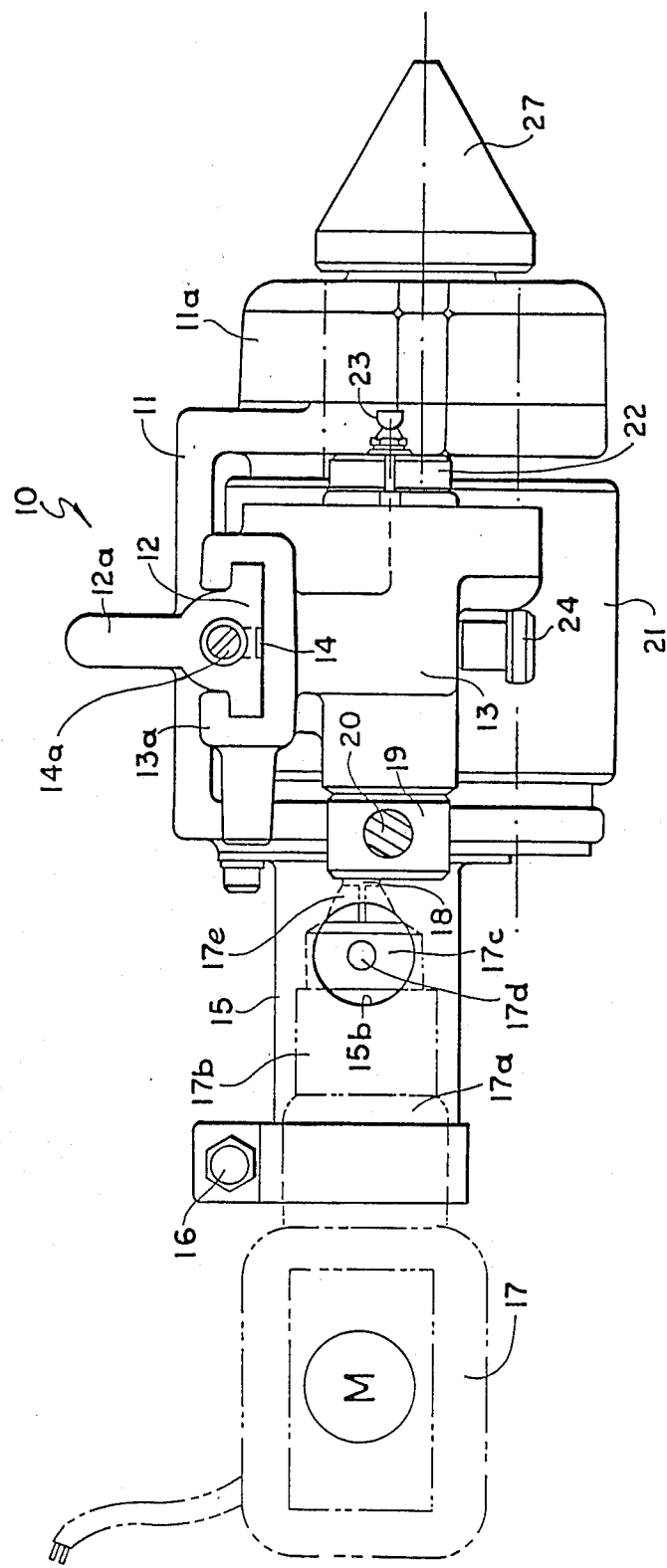
FIG. 1 is a top view of the assembled machine according to the invention.
Figure 4:
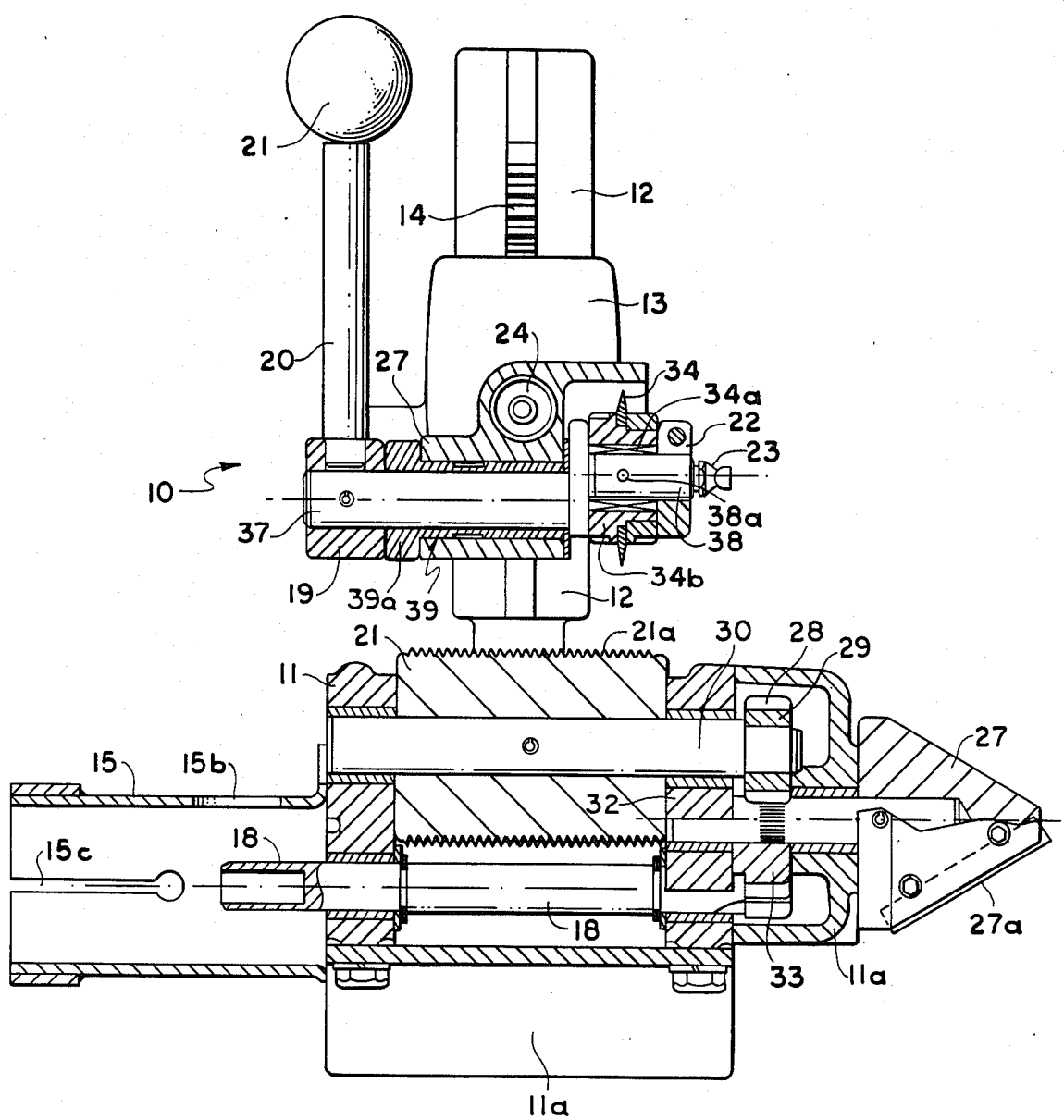
FIG. 4 is a partially sectioned lateral view taken as indicated at 4—4 on FIGS. 2 and 3.

Referring now to FIG. 1, the machine 10 includes a body or housing 11 and support base 11a affixed thereto, these elements being also seen in FIGS. 2–4. This housing is fabricated, preferably as a casting, with sufficient wall thicknesses to permit bores therein for bearing, etc.; insertion as will be evident from FIG. 4. These bearings supporting driven shaft 18, shaft 30 for roller 21 and a similar shaft for roller 31 and cutter wheel 34 (see FIG. 4) may be considered known and conventional, especially in view of the disclosure of similar structure in hereinbefore mentioned U.S. Pat. No. 4,072,073.

Figure 5:
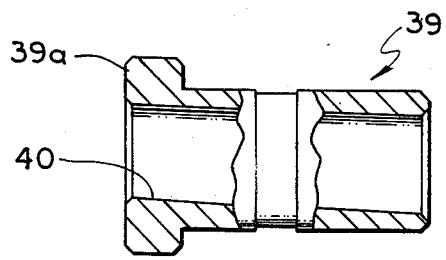
FIG. 5 is an axially sectioned exaggerated view of the skewed-bore bushing shown in FIG. 4.
Figure 6:
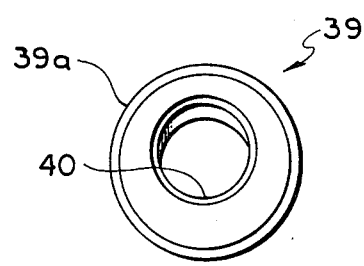
FIG. 6 is an end view of the skewed-bore bushing shown in FIG. 5.

The housing 11 rests on a portion 11a and is attached to or integral with a column 12 having a stiffening rib 12a, the latter visible in all except FIGS. 4–6. A cutter head assembly rigid housing member 13 will be seen to include a "wrap-around" (c-shaped) portion 13a which is capable of sliding, in the vertical dimension, over column 12, this having the effect of positioning the entire cutter head assembly 10a as a unit. Grooves 14 in column 12 (see FIG. 4) provide the fixed portion of a locking locator arrangement. The knob 24 is fixed to shaft 25 (see FIG. 2) and its end 24a is held against the surface of 12 adjacent to the grooves 14 by a compression spring 26 such that a pin end 24b engages one of the grooves 14 at operator choice. To accomplish relocation of the cutter head assembly (for coarse cutter positioning) the knob 24 is simply pulled outward while the assembly 10a is manually supported and vertically pushed into a new selected position, at which time knob 24 is released and the pin 24b engages a new groove among grooves 14.

In lieu of grooves 14 in the column body 12, a separate elongated member containing the squared slots 14 may be emplaced therein.

Normally, the positioning of cutter head assembly 10a is such that cutter wheel 34 is almost in contact with the work 35, with handle 20 and grip knob 21 in the rest position as identified on FIGS. 2 and 3 so that operation of lever (handle) 20 promptly begins the cutting action. Scale 36 and pointer 36a are included for calibrated presetting of the cutter head height before any work is placed against rollers 21 and 31. Actually, the drawings contemplate use of the separate elongated member aforementioned and a one-time adjustment is shown in the form of a screw 14a through the top of 12 and seated therein and also engaging the elongated separate piece providing grooves 14. Thus another manufacturing tolerance relief feature is provided for vertical preset of the grooves 14.

Operating handle 20 will be seen to rotate hub 19 and therefore shaft 37 eccentrically joined to the center line of shaft 38 and therefore to the axis of cutter 34. From FIG. 4 it will be apparent that eccentric action is achieved by virtue of the offset of the center lines of 37 and 38, those members being attached or integral at their inner ends. Free-wheeling of cutter 34 means that it is not independently driven but, of course, it will rotate by virtue of frictional contact with the work 35 which is rotated by rollers 21 and 31 driven to rotate in the same rotational sense. The grease zerk 23 provides lubrication of the cutter assembly bearing 34a in a conventional manner through an axial bore in shaft 38 and lateral hole 38a.

The rollers 21 and 31 rotate in the same directional sense and may have shallow circumferential grooves or surface knurling for improved grip on the work. Gears 28 and 32 rotate in the same direction (sense) on conventional bearings, their teeth (such as 28) engaging the teeth of idler gear 33. The gears 28, 29 and 32 and their support shafts are so arranged as to drive the reamer cone 27 at a lower speed than the speed of the rollers. Cutting edge 27a provides internal pipe reaming when the work is separately held over 27. Driven shaft 18 is conventionally supported and projects within a sleeve 15. Here the chuck 17c of drill motor comprising 17, 17a and 17b engages and grips shaft 18. A hole 15b in sleeve 15 allows the insertion of a standard chuck key at 17d to tighten the jaws 17e of chuck 17c. A circumferential band is tightened at 16, forcing compression of sleeve 15 over drill motor body portion 17a, the slot 15c providing the necessary yield.

FIGS. 5 and 6 depict side and end views of bushing 39. The bore 40 is skewed with respect to the axis of the cylinder represented by the outside surface of 39. The flanged end 39a will be seen to facilitate seating of the bushing 39 in a bore in body member 27 as depicted in FIG. 4 in particular. Bushing 39 includes a mid-body external groove (see FIGS. 4 and 5). A set screw (not shown) through body member 27 into this groove provides for locking of bushing 39 in place, once its rotational orientation has been determined empirically.

It will be apparent that rotational positioning of bushing 39 changes the angle of shaft 37 with respect to horizontal and vertical reference lines. If the bushing is rotated about its axis by 360°, then the motion of the outward end of shaft 37 joined to 38 describe a circle. This then changes the orientation of the cutter wheel 34 in two planes. The cutter head assembly includes the cutter wheel 34, 38, a cutter arbor 34b and a jamb nut held in place by a split ring clamp 22.

Ordinarily the manufacturing tolerances are sufficiently good without high precision (expensive) machining operations to require only a degree or two of adjustment by rotation of the bushing 39. The inevitable variation of the plane of the cutter wheel from the vertical, accompanying the optimization of the cutter wheel orthagonal interface with the work in the horizontal plane to achieve squared off cutting, is of no substantial consequence.

Materials for construction of the machine herein disclosed are entirely conventional and well-known. Their selection is readily effected by the person of ordinary mechanical skill. The body (housing) parts, such as 11, 13 and the column 12 are preferably ferrous on non-ferrous castings, but may be fabricated from known, high strength moulded plastic material. Metallic inserts are desirable where bearings, etc. are supported by housing walls, if such moulded plastic construction is employed.

Modifications and variations of the specific structure will suggest themselves to those of skill in the art, once the novel teachings are appreciated. One such variation could be the location of the skewed bore bushing about the shaft 38 rather than about shaft 37. Certain accommodations of bearing surface and other cutter head details would, of course, be required. The result would be substantially the same, however, the disclosed location of bushing 39 about shaft 37 is to be preferred in that it is readily accessible. A knurled surface about the circumference of bushing 39 at 39a where it abutts operating handle hub 19 can be employed for ease of adjustment.

It will also be realized that a fixed electric drive motor could be substituted for the hand drill if desired. The hand drill power source is shown as a disclosure of a minimum cost arrangement.

Other variations within the spirit of the invention are obviously possible. Accordingly, it is not intended that the scope of the invention should be considered limited to the speciiic showing of the drawings or the details of this description, these being intended as typical and illustrative only.

What is claimed is:

1. A machine for transverse cutting of pipe work comprising:
   first means for supporting said pipe work from below generally horizontally and for imparting rotational motion of said pipe work about its longitudinal axis;
   a cutter head assembly including a free-wheeling cutter wheel supported above said pipe work on a first shaft, and a second shaft eccentrically joined to said first shaft, said second shaft being arranged to be rotated by an operator to cause said cutter wheel to advance against said pipe;
   second means including a housing adjustably located above said first means;
   third means including a skewed bore bushing through which said second shaft passes and a housing bore within said second means housing into which said bushing is fitted, whereby rotational adjustment of said bushing within said housing bore effects the angular orientation of said first shaft axis with respect to said pipe work axis.

2. Apparatus according to claim 1 in which first means comprises a geared transmission arrangement and pair of rollers arranged substantially parallel to each other and driven through said transmission arrangement to rotate in the same rotational sense, said rollers forming an elongated cradle between them for accepting said pipe work.

3. In a machine for transversely cutting pipe, said machine including a base member and a first rigid housing attached thereto, said first rigid housing having associated therewith a pair of generally horizontal pipe support and drive rollers and motive power means for causing said rollers to rotate to correspondingly rotate said pipe about its longitudinal axis, the combination comprising:

first means comprising a rigid generally vertical column fixed to said first rigid housing and a selectively, vertically positionable cutter head assembly associated with said column;

second means within said cutter head assembly comprising a first shaft, a cutter wheel mounted to free-wheel thereon and a laterally offset second shaft having its longitudinal axis generally parallel to the longitudinal axis of said first shaft;

third means comprising a bushing having a skewed axial bore therein rotatably mounted within said cutter head assembly, said second shaft passing through said skewed bore with rotational freedom;

and operator controlled means for effecting rotation of said second shaft to advance said cutter wheel toward said pipe, rotational adjustment of said bushing thereby tending to align said first shaft axis with said pipe longitudinal axis in a common vertical plane.

4. Apparatus according to claim 3 in which said operator control means comprises a hand lever connected to said second shaft to effect rotation of said second shaft through a predetermined angle.

* * * * *